United States Patent [19]
Nakano et al.

[11] Patent Number: 5,360,263
[45] Date of Patent: Nov. 1, 1994

[54] MODULAR SELF-LOCKING PANEL

[75] Inventors: Yoji Nakano; Amilton F. de Almeida, both of Sao Paulo, Brazil

[73] Assignee: Brastemp S.A., Sao Bernardo do Campo-SP, Brazil

[21] Appl. No.: 64,341

[22] Filed: May 19, 1993

Related U.S. Application Data

[63] Continuation of Ser. No. 670,247, Mar. 15, 1991, abandoned.

[30] Foreign Application Priority Data

Mar. 22, 1990 [BR] Brazil .............................. PI9001543

[51] Int. Cl.$^5$ .............................................. A47B 47/00
[52] U.S. Cl. .................................. 312/257.1; 312/263; 403/231
[58] Field of Search .................... 312/257.1, 263, 265.5, 312/265.6; 108/111, 153; 52/79.1, 79.5, 270, 284; 403/231, 382, 403

[56] References Cited

U.S. PATENT DOCUMENTS

| | | | |
|---|---|---|---|
| 3,567,300 | 3/1971 | Mari | 312/257.1 |
| 3,779,623 | 12/1973 | Motohashi | 312/257.1 |
| 3,826,206 | 7/1974 | Ruggles | 108/153 X |
| 4,171,150 | 10/1979 | Soderlund | 312/263 X |
| 4,782,972 | 11/1988 | Wenkman et al. | 52/284 X |

Primary Examiner—Brian K. Green
Attorney, Agent, or Firm—Darby & Darby

[57] ABSTRACT

Self-locking panels connectable in a closed polygon in which each panel has opposing connecting edges and end edges with a plurality of first locking elements (1) spaced along one connecting edge and corresponding first locking element receivers (20) spaced along the other connecting edges to connect adjacent panels to prevent their separation in first and second directions orthogonal to their line of connection. Each panel also has a first backstop (30) along one connecting edge and a first backstop receiver (40) along the other connecting edge to prevent displacement of the connecting edge of one of the adjacent connected panels in the second direction. Further, each panel has a second locking element (50) adjacent one of the connecting edges and corresponding second locking element receiver (60) adjacent the other connecting edge to connect adjacent panels to prevent their relative displacement in a direction parallel to the line of connection. A third locking element (30, 70) along one of the connecting edges of one panel fits the connecting edge of the adjacent panel to prevent rotation of the adjacent panel inwardly of the polygon around the connection line. An elastically deformable member (80) is engaged between one of the connecting edges of one panel and the structure of the other of the adjacent panels to urge the latter in a direction orthogonal to the connection line and pushes the adjacent panels in a spaced apart relationship relative to the connection line.

20 Claims, 10 Drawing Sheets

MODULAR SELF-LOCKING PANEL

This is a continuation of application Ser. No. 07/0670,247, filed Mar. 15, 1991, now abandoned.

FIELD OF THE INVENTION

The present invention relates to modular, self-locking panels connectable to each other so as to form closed polygonal structures such as those employed in cabinets for the assembly of home appliances.

BACKGROUND OF THE INVENTION

Modular panels are often obtained by conventional polymer forming processes such as Thermoplastic Injection Molding (TIM) and Reaction Injection Molding (RIM) in molds manufactured so as to incorporate latching elements for self-locking, responsible for the locking of relative approach, separation and rotation movements between each pair of adjacent panels.

A known solution for the shaping of cabinets employed in home appliances employs sheets attached to each other by means of a screw on a frame that provides the structure and stiffness for the cabinet. Another solution is the utilization of a single sheet that on being folded and formed is attached by means of welding, rivets or any other fastening means. Those solutions have the drawback of requiring various equipment for the folding, shaping and attachment of the cabinet, in addition to making the storage of large quantities of parts in stock unfeasible, due to the volume of each assembled cabinet.

SUMMARY OF THE INVENTION

It is an object of the present invention to provide interconnected modular panels forming closed polygons, which are particularly useful in the shaping of cabinets for home appliances, which eliminate the manufacture, assembly and storage drawbacks being obtained in the shape of single parts obtained from injection molds which, due to their dimensions, are more easy for handling, transportation and storage.

Another object of the present invention is the construction of modular panels of the above-mentioned type, provided with locking means incorporated as part of the body thereof that facilitate the formation of closed polygons without the need of employing additional attachment or locking means between panels.

Still another object of the invention is the formation of closed-polygon structures having no relative approach, separation or rotation movements between their component parts, so as to maintain the structures as stiff polygonal cabinets by the self-locking of the component panels thereof, employing attachment elements already incorporated to the body of each panel.

Those objects are attained by the obtention of modular panels which are self-lockable to each other, following an intersection line and with a closed polygon comprised of at least one type of panel, each having a pair of connection edges opposed to each other, at least a pair of opposed end edges. A first locking means is provided along at least one of the connection edges of first panels that can be attached to first receiving means provided along at least another connection edge of an adjacent panel, so as to prevent the separation of two adjacent panels in a first and a second direction orthogonal to the intersection line of said panels, said directions being perpendicular to said intersection line, parallel respectively to the face of the first panels and the adjacent panels.

There is also a first backstop means provided along at least one of the connection edges of modular receiving panels and first backstop receiving means provided along at least another connection edge of adjacent panels adjacent to the receiving panels. The first backstop means seats against the first stop receiving means, so as to prevent the displacement of said other connection edge of one of the adjacent panels in the direction of the other connection edge of the modular receiving panels, in the second direction orthogonal to the intersection line of each pair of adjacent panels and parallel to the modular receiving panels. A second locking means is also provided near at least one of the connection edges of the connecting modular panels and second lock receiving means provided near at least another connection edge of the adjacent to the modular connecting panels. The second locking means is adaptable to the second lock receiving means so as to prevent the relative displacement between adjacent panels, in a parallel to the intersection line.

There is also a third locking means provided along at least one of the connection edges of locking modular panels and fitting the connecting edges of adjacent panels, so as to prevent the rotating movement between a pair of adjacent panels around the intersection line thereof and in the direction of a decreasing dihedral angle. An elastic deformable means is located between at least one of the connection edges of adjacent adjustment panels and the structure of the adjacent panel, so as to constantly urge the latter in a direction orthogonal to the intersection line thereof and pushing each panel into a separation position therebetween from said intersection line.

BRIEF DESCRIPTION OF THE DRAWINGS

A preferred embodiment having only one type of panel and having two different types of opposed connection edges, provided with differentiated locking means will be described hereinbelow on the basis of the annexed drawings, wherein.

DETAILED DESCRIPTION OF THE INVENTION

In accordance with the figures shown, each modular panel P comprises two opposite connecting edges, each incorporating locking means that prevent relative approach, separation and rotation movements towards a decreasing dihedral angle between two adjacent panels.

A first connecting edge A is provided with first locking means in the shape of projections 10 distributed along its length that can be latched to respective retaining cavities 20 defining first receiving, locking means, arranged along an opposite connecting edge B of an adjacent panel. Those retaining cavities 20 are defined in a recessed body portion R of said opposite connecting edge B, dimensioned so as to receive a flexible flap 90 extending from the connecting edge A of another modular panel P, being turned towards the inner face of the adjacent panel so that, in an operating position, the same presents its outer face coplanar with the external face of said panel. From the inner face of each modular panel P a plurality of backstop elements 30, defining first backstop means extends aligned with and spaced apart from the flexible flap 90, so as to create a space to be filled by the fitting of the opposite connecting edge B of an adjacent panel.

Each backstop element 30 presents an abutting face 31 facing towards the adjacent panel and seatable in a latching position on a corresponding contact face 41 of support shoes 40, which define first backstop receiving means.

In the preferred embodiment the support shoes 40 are a body portion raised from the inner face of the opposite connecting edge B of the adjacent panel, in the receiving region of each respective backstop element 30.

In another embodiment the contact of each backstop element 30 with the opposite connecting edge B of the adjacent panel is directly with the inner face thereof.

The contact between each backstop element 30 and its corresponding support shoe 40 prevents the adjacent panel from displacing itself in the direction of the connecting edge A of the panel provided with the backstop element in a direction perpendicular to the intersection line L. In another design option, the contact face 31 turned towards the adjacent connecting edge has an irregular surface which by friction prevents the displacement of said locking element 30 on the respective support surface 40, acting as a locking reinforcement.

In addition, said elements 30 and respective support surfaces 40 may have more than one contact surface, so that the second ones act as a guide for the first ones, thereby reinforcing the effect of movement lock.

Figures 4, 5, 6, 13:
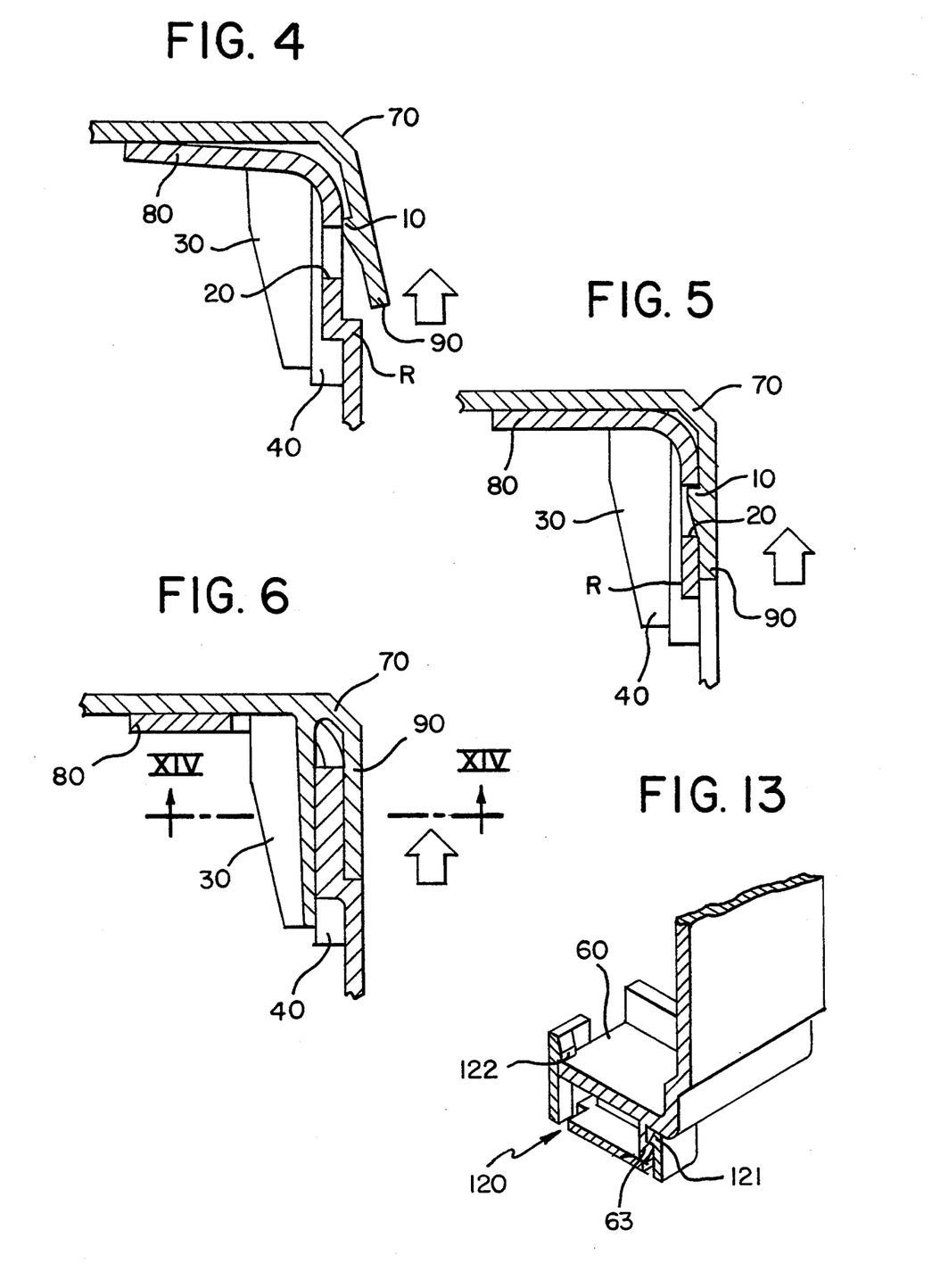
FIG. 4 shows a cross-section along lines IV—IV of FIG. 3 in the fitting region of the panels, containing details of said fitting.
FIG. 5 shows a detail in cross-section along lines V—V of FIG. 3 during the fitting of two adjacent panels.
FIG. 6 is a cross section along lines VI—VI FIG.3 of the backstop fitting.
FIG. 13 represents a longitudinal cross section taken along line XIII—XIII of FIG. 10 of a lower angle plate fitted to one of the panels near one of the connecting edges.
Figure 7:
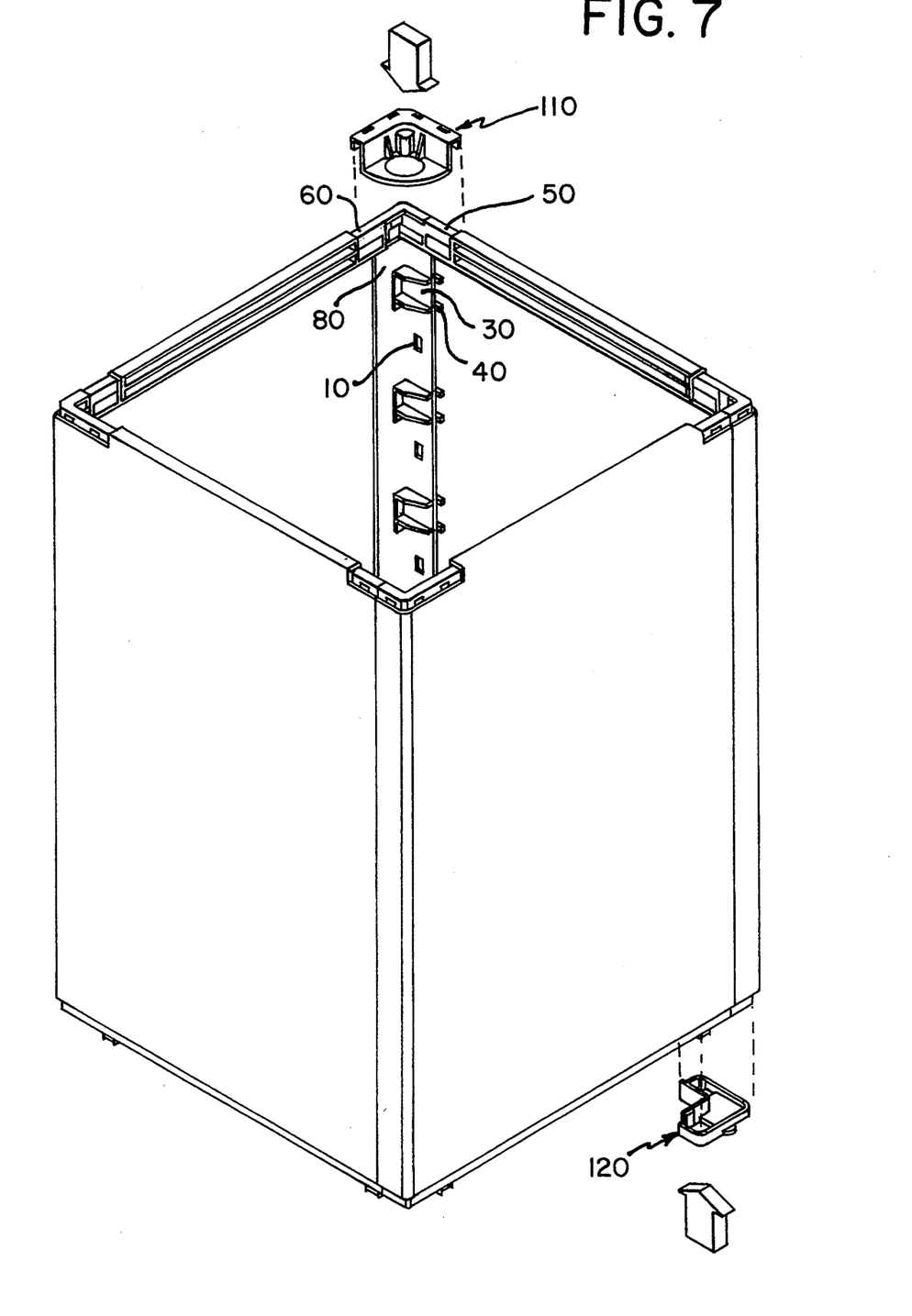
FIGS. 7 and 7a show, respectively an assembly cabinet and the placement of an upper and a lower angle plate and a detailed view of the upper fitting region of two adjacent panels.
Figure 7A:
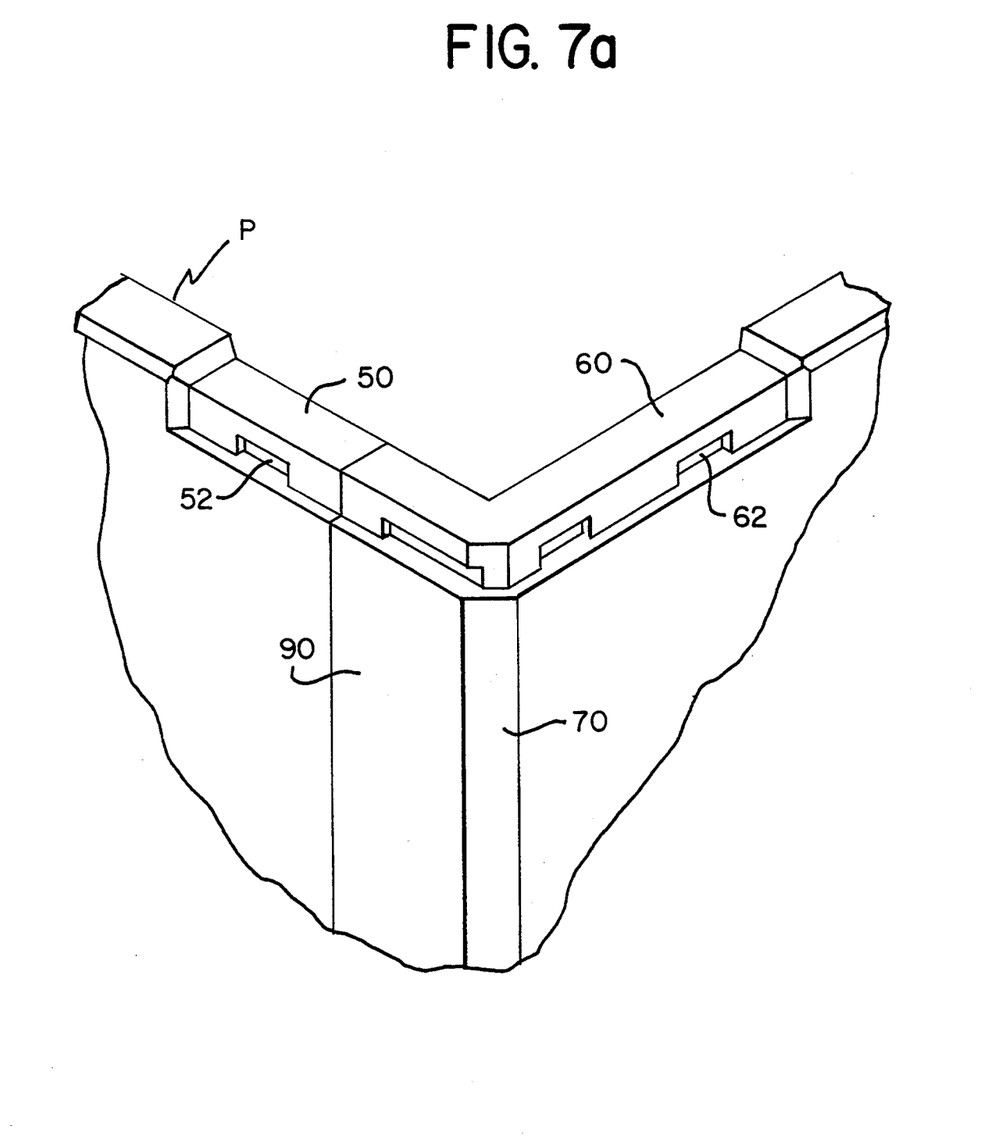
Figure 8:
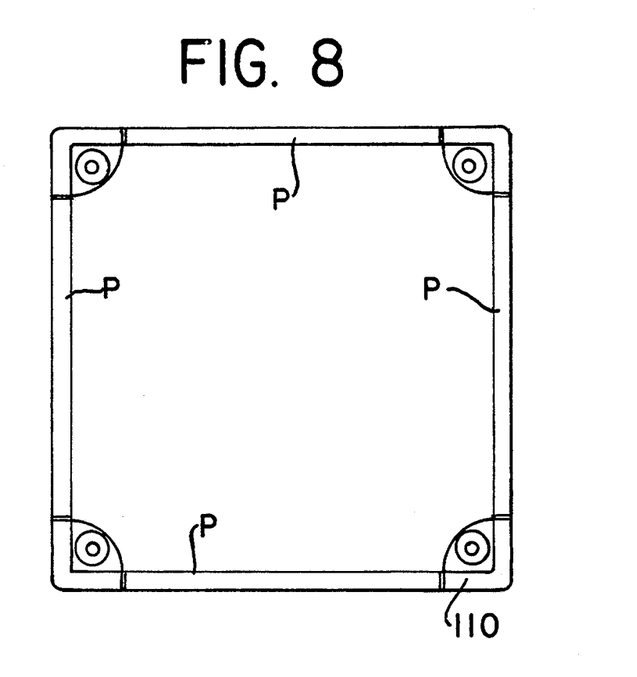
FIG. 8 shows an upper view of an assembled cabinet with the upper angle plates.
Figure 9:
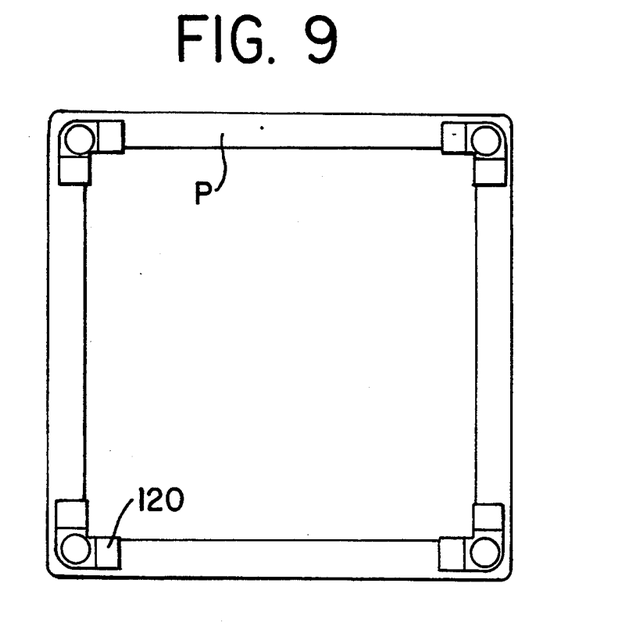
FIG. 9 shows a lower view of an assembled cabinet with the lower angle plates.
Figure 10:
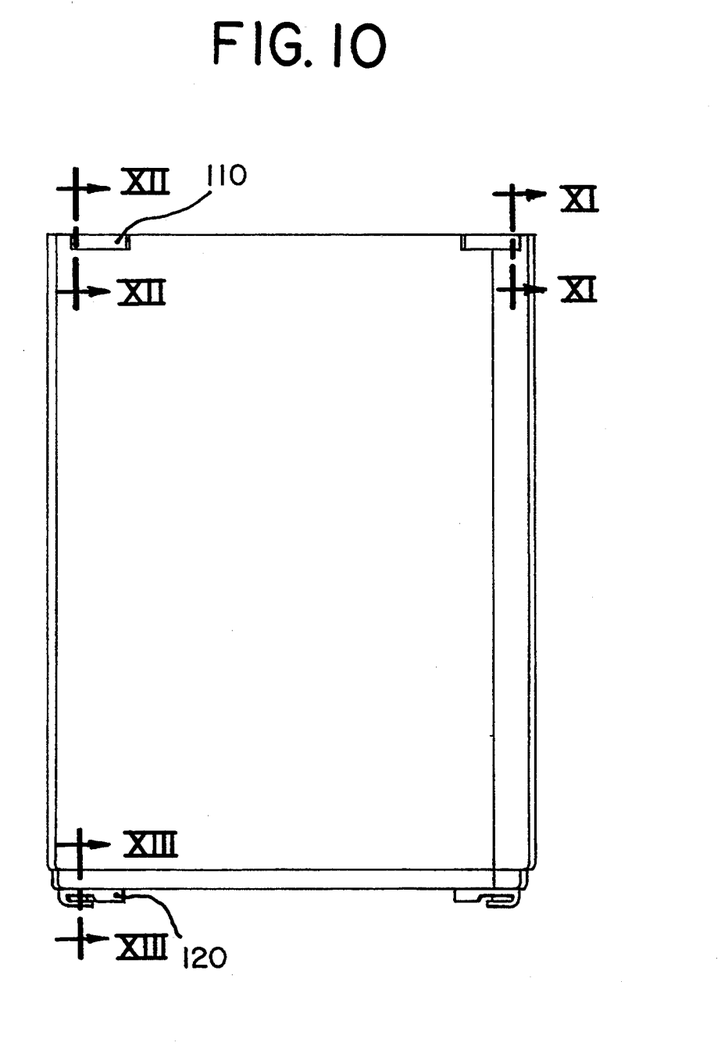
FIG. 10 shows a side view of the assembled cabinet with two upper and lower angle plates.
Figure 11:
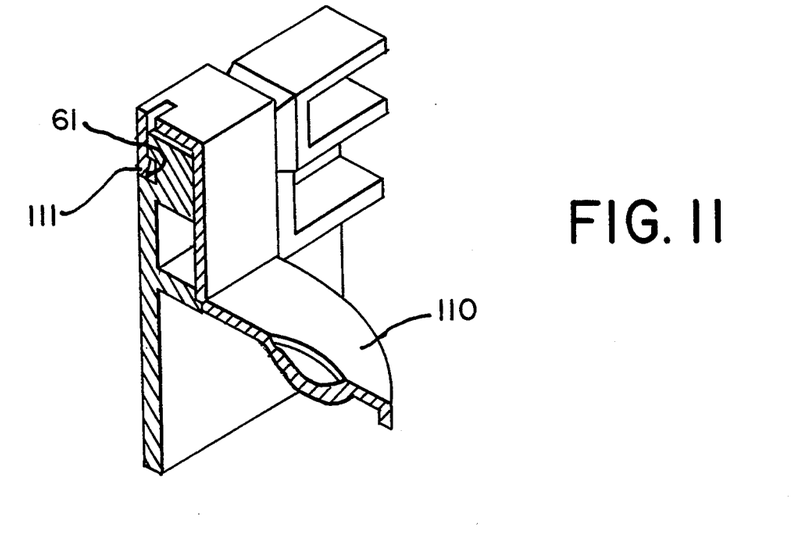
FIG. 11 represents a cross-section taken along line XI—XI of FIG. 10 showing the fitting region of an upper angle plate as seen from the side of one of the connecting panels.
Figure 12:
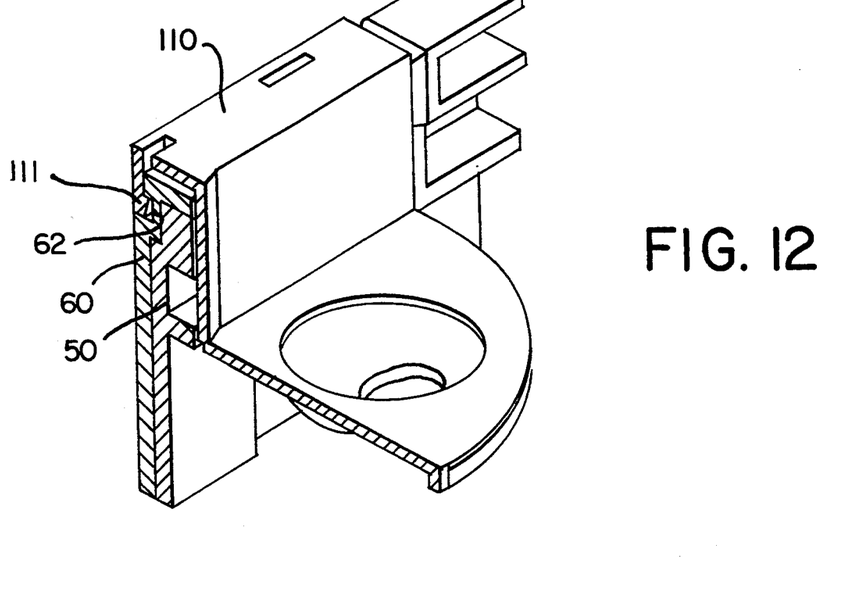
FIG. 12 represents a cross-section taken along line XII—XII of FIG. 10 in the fitting region of the upper angle plate, as seen from an adjacent panel.
Figure 14:
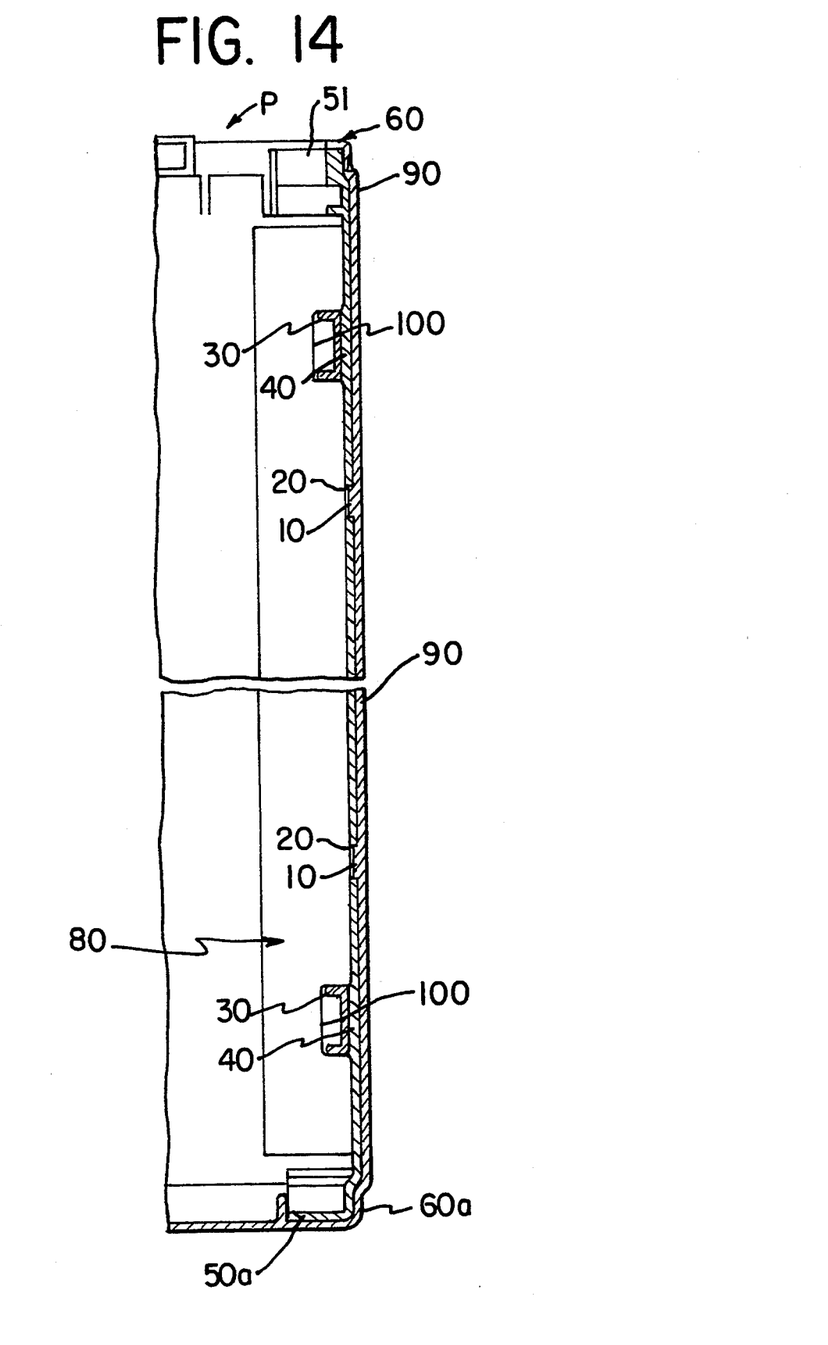
FIG. 14 represents a vertical, longitudinal cross-section line XIV—XIV of FIG. 6.

FIGS. 4, 5 and 6 show in further details the latching of two adjacent panels orthogonal to each other, where it is possible to see in the same plane the elements responsible for the locking in a first and a second direction, orthogonally to the intersection line L and for the locking of the rotation movement around said intersection line, in the direction of a decreasing dihedral angle. The latching of the opposite connecting edges A and B of adjacent panels is obtained, in accordance with FIG. 4, by initially urging the flexible flap 90, extending from a junction 70 of the connecting edge A with the face of the respective modular panel, to an opening position in the direction of increasing dihedral angle.

In that position, said panel receives the opposite connecting edge B of an adjacent panel, from which extends an end projection 80 to be arranged so as to contact the inner face of said panel. The projection 80 urges the panels into latching in a position of mutual separation. Said flexible projection 80 of edge B of the adjacent panel defines the elastic means and the actuation thereof on the face of the other panel eliminates gaps between the adjacent panels in the latching thereof.

The pressure exerted by projection 80 is calculated in a manner so as to compensate the resulting forces from the opposite direction against the face on which it acts, so as to maintain the stiffness of the latching connections of the polygon.

In a non-operating, non-latching position of the panels, the flexible projection 80 presents an angular opening that is non-parallel to the inner face of the adjacent panel with which it maintains contact in the latching position. In the preferred embodiment, the flexible projection 80 extends from the inner face of each panel, with an angular opening greater than the dihedral angle of the junction of the adjacent panels.

Figure 1:
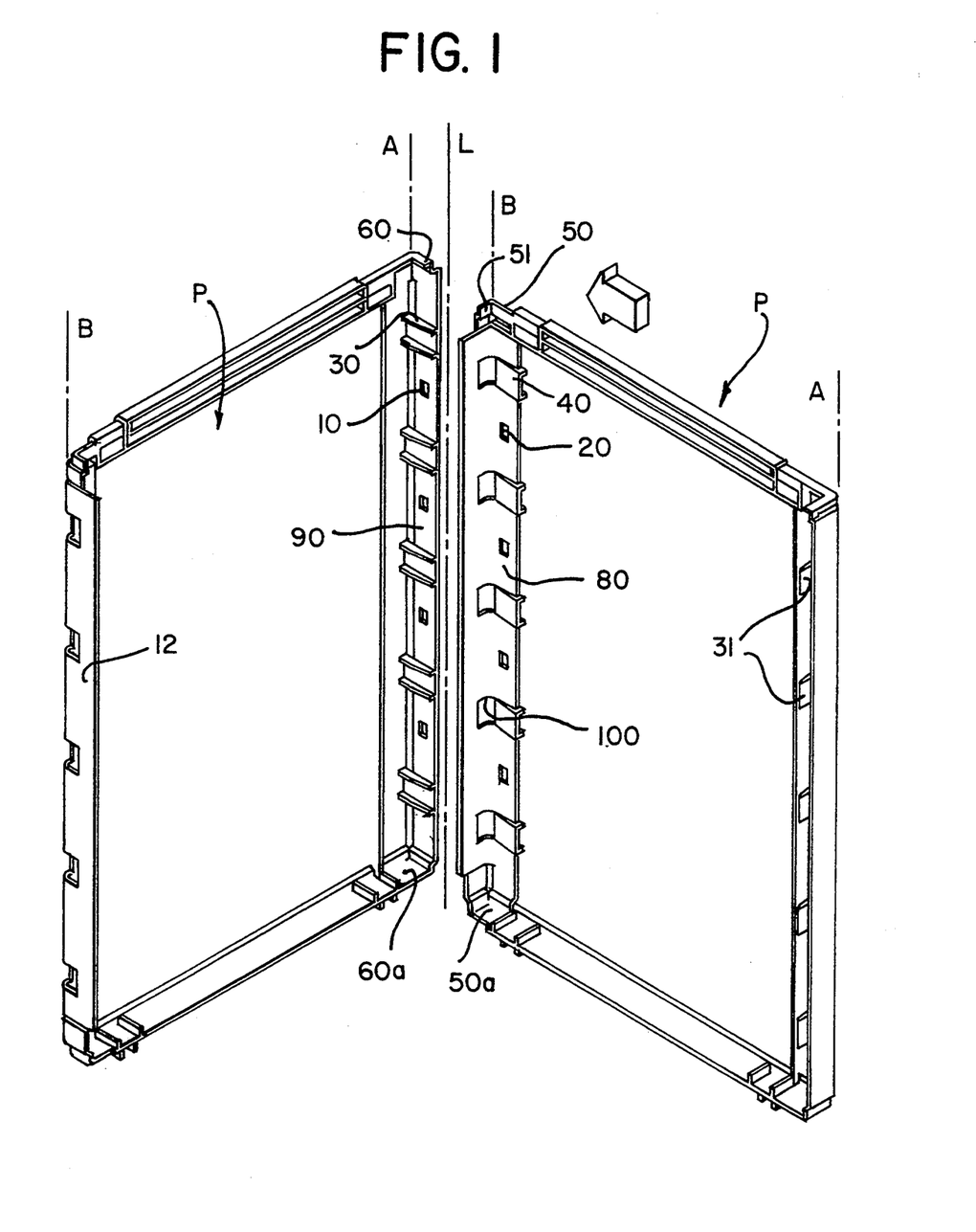
FIG. 1 shows a preferred embodiment for two adjacent panels with their fitting elements not latched together, presenting the intersection line therebetween and fitting direction provided by the upper arrow.
Figure 2:
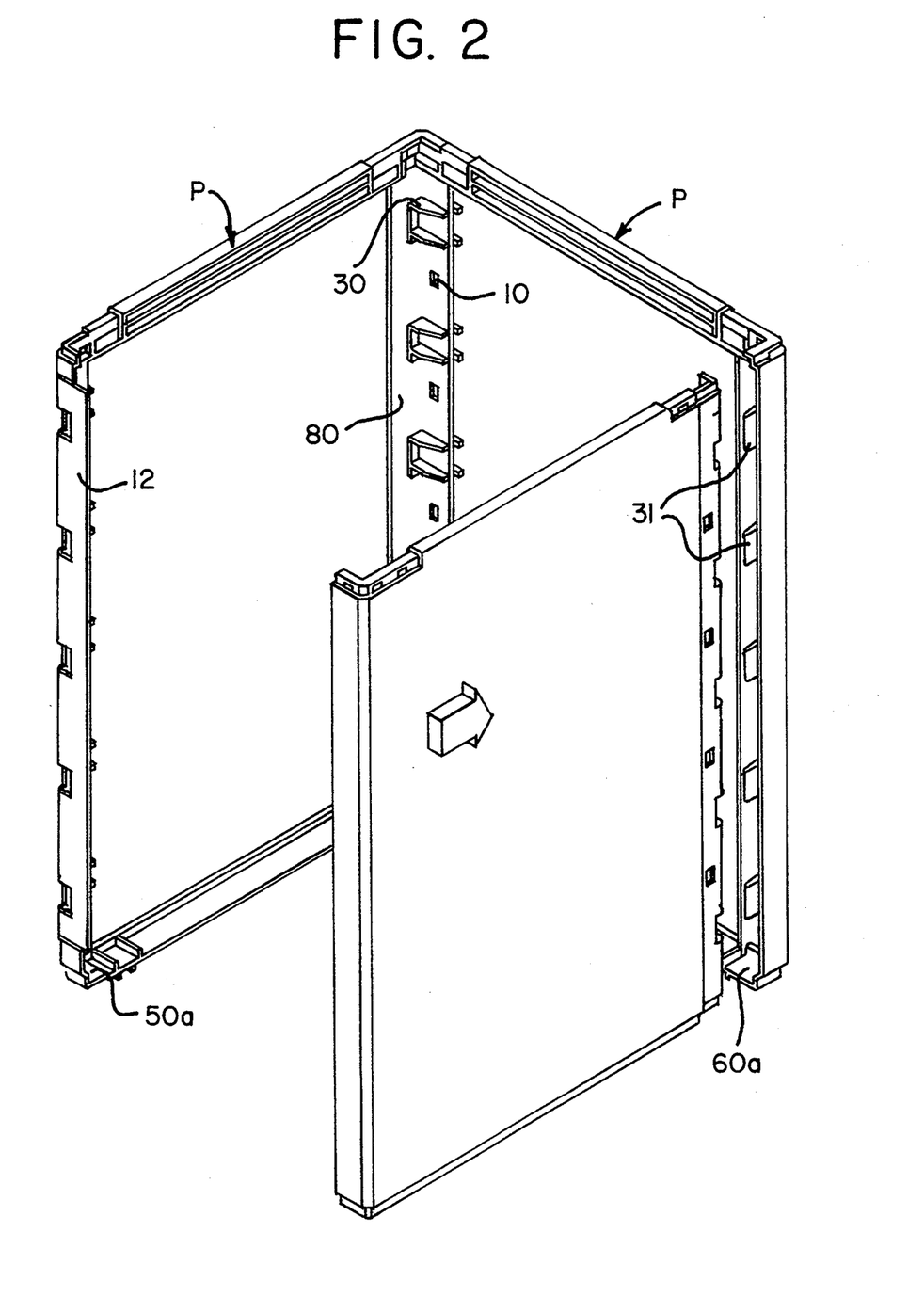
FIG. 2 shows two panels already fitted to each other according to an intersection line thereof to a third panel to be latched thereto.

Both the flexible flap 90 and the flexible end projection 80 have their external faces turned towards the inner face of the adjacent panel. In a second design option, both the flexible flap 90 and the flexible end projection 80 do not extend continually along the connecting edge B but rather as spaced apart ribbons distributed therealong, thereby preventing the existence of windows 100 (FIGS. 1 and 2). In the case of the flexible flap 90, the projections 10 would be provided as respective ribbons defining said flap 90.

The corner junction 70 and the support shoes 40 also define a third locking means that prevent the relative rotating movement between two adjacent panels perpendicularly to the intersection line L thereof and in the direction of a decreasing dihedral angle.

Figure 3:
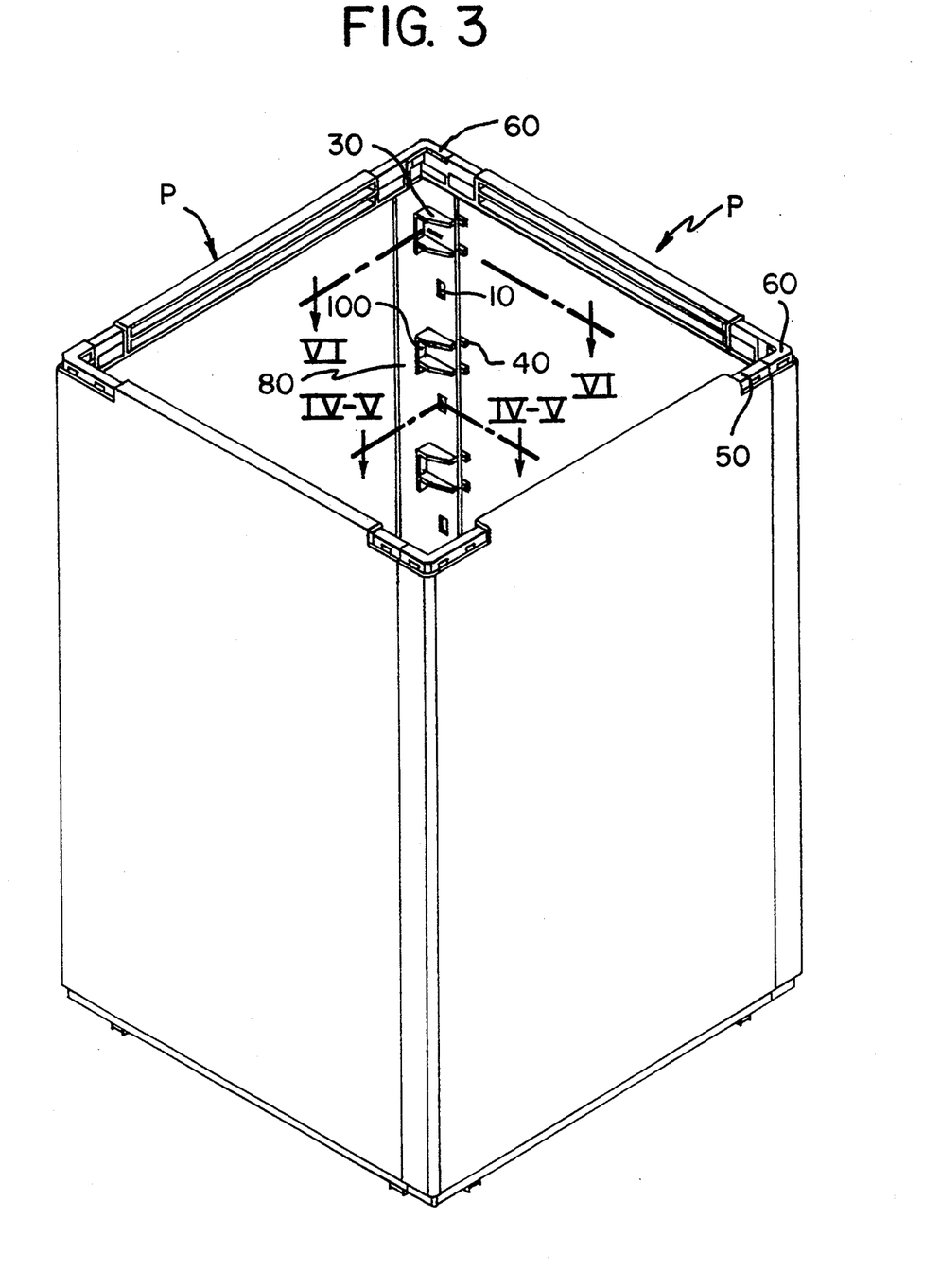
FIG. 3 shows four panels fitted to each other as in a modular cabinet.

The construction of these modular panels also provides for the locking of movements in a direction parallel to the intersection line L between two adjacent panels, by means of the provision on the end portions of the upper and lower edges B of locking surfaces 50, 50a, which seat against respective retaining flanges 60, 60a orthogonal to the intersection line L and arranged on the end portion of the connecting edge A of the adjacent panel, respectively defining the second locking means and second locking receiving means (FIGS. 1-3). The upper locking surfaces 50 are also provided with a body portion 51 extending from the corresponding connecting edge B, and parallel to the plane of the adjacent panel, but not necessarily aligned with the flexible end projection of the respective, opposed connecting edge B. At the upper edge of the panels, that locking also possesses a first reinforcement obtained by a stop on the outer face of the locking surfaces 50 and upper flanges 60, causing a decrease in the thickness thereof which, in the latching position, form external contours that are non-parallel with the face of each respective panel, the outer step of each flange 60 and locking surface 50 being provided with at least a recess 52, 62 wherein is seated a corresponding latch 111 incorporated to the inner face of a lateral continuous wall of upper angle plates 110 so as to maintain the outer face thereof coplanar with the respective outer face of each modular panel.

In the solution presented the closed polygons are also provided with lower angle plates 120, both defined by an "L"-shaped channel orthogonal to the intersection line of two adjacent panels and so as to maintain the same dihedral angle of the respective vertex and fitted over a portion of reduced thickness of said lower retaining flanges 60a. The lower retaining angles 120 are fitted to the polygon through first and second latching portions 121, 122 extending from the free end of lateral, continuous and opposite walls of said channels, that seat on respective steps 63 provided on the lower portion of a corresponding vertex of the polygon.

In another embodiment the lateral walls of each angle plate are present in a discontinuous manner, being present only in the latching regions for each corresponding recess or step portion of each polygon vertex.

In the case of the upper angle plates, a support platform may extend from the edge of its wall internal to the polygon in any plan parallel to the plane of the corresponding end edges, so as to receive and attach parts or elements such as motors, intended for the respective polygon. In the option presented on FIGS. 7, 7a, 8, 9, 10, the lower angle plates are provided of feet-like portions, optionally adjustable to allow the levelling of the assembly with the surface on which it rests.

In another embodiment the polygons would be formed by at least two types of panels differentiated from each other not by the different opposed connecting edges, but rather by the provision of the same types of elements in each of them. In this embodiment, one type of panel presents opposing connecting edges containing the first locking and backstop means and the third locking means and second lock receiving means, while another adjacent panel would be provided with first and third lock receiving means, first backstop receiving means, second locking means and an elastic means. In this manner, the manufacture and assembly of modular cabinets becomes more practical and provides the users with lightweight, sturdy and more durable elements because, since they are made of a non-metallic material, are immune to oxidation and rust which are customary in the cabinets employed in the current home appliance cabinets.

What is claimed is:

1. A polygonal structure comprising:
   at least three self-locking panels with pairs of adjacent panels joined together along a respective intersection line and being assembled in a closed polygon, each panel having
   an inner face and an outer face,
   first and second opposed connecting edges and a pair of opposed end edges;
   a flexible flap extending from said first connecting edge;
   a plurality of projections provided along said flexible flap;
   a plurality of retaining cavities each arranged in a respective external recessed portion extending along said second connecting edge of each said panel and aligned to receive a respective projection of said first connecting edge of an adjacent panel to join and prevent the separation of two adjacent panels in a first and a second direction each generally orthogonal to the intersection line of said two adjacent panels of a pair,
   said flexible flap being elastically deformable from a locking position wherein the projections of one panel are fitted into the respective cavities of an adjacent panel, to a release position wherein the projections are released from the respective cavities;
   a flexible end projecting means arranged on said second connecting edge of each said panel to underlie said first connecting edge of an adjacent panel to urge the adjacent panel in a direction generally orthogonal to the intersection line therebetween and pushing each panel into a position of separation therebetween from said intersection line, said plurality of retaining cavities arranged in a portion of the respective second connecting edge provided with the flexible end projecting means;
   a plurality of backstop elements provided along and projecting from the inner face of each said panel and extending parallel to a face of the adjacent panel;
   a plurality of support shoes provided near and along said second connecting edge of each said panel, each support shoe receiving and holding a respective backstop element of the adjacent panel upon connection of two adjacent panels to prevent the relative displacement of two adjacent panels in a direction generally orthogonal to the intersection line of said two adjacent panels and parallel to the panel with the backstop elements; and
   a junction section connecting said first connecting edge of each said panel and the flexible flap into which the second connecting edge of the adjacent panel is fit to prevent, together with said backstop element, the relative rotating movement between the two adjacent panels around the intersection line thereof and in the direction of a decreasing dihedral angle.

2. A structure in accordance with claim 1, wherein the flexible flap extends along the length of said first connecting edge.

3. A structure in accordance with claim 1, wherein the flexible flap is seated in a locking position on a respective recessed portion of the adjacent panel so as to have its outer face coplanar with the outer face of the adjacent panel.

4. A structure in accordance with claim 1, wherein the flexible end projection is turned towards the inner face of the adjacent panel and is elastically deformable to press against the inner face of the adjacent panel.

5. A structure in accordance with claim 1, wherein the flexible end projection has windows along an extension of said second connecting edge aligned with each support shoe, a backstop element passing through a respective window upon connection of the adjacent panel.

6. A structure in accordance with claim 1, further comprising:
   a locking means at each end of one of said first and second connecting edges and a mating retaining flange at each of the ends of the other of said first and second connecting edges of said locking means being seatable in the retaining flanges of the adjacent panel to prevent the relative displacement between the two adjacent panels in a direction parallel to the intersection line.

7. A structure in accordance with claim 6, wherein each locking means comprises a portion at an end of one of the edges of a panel adjacent to said second connecting edge thereof.

8. A structure in accordance with claim 7, wherein a portion of said second connecting edge incorporates an internal flap parallel to an adjacent panel to receive the retaining flange of the adjacent panel.

9. A structure in accordance with claim 6, wherein the retaining flanges are generally orthogonal to the intersection line of two adjacent panels and internal in relation to the respective panel.

10. A structure in accordance with claim 9, further comprising angle plates arranged in two planes orthogonal to the intersection line of adjacent panels and coinciding with the opposite end edges of the panels, each angle plate being attached across the end edges of two adjacent joined panels.

11. A structure in accordance with claim 10, wherein each plane formed by the opposite end edges of the panels is provided respectively with an upper angle plate and a lower angle plate, each plate comprising an "L"-shaped channel orthogonal to the intersection line of two adjacent panels, said panel having a portion of reduced thickness of the end edge thereof on which the angle plate is fitted.

12. A structure in accordance with claim 11, wherein the locking means and retaining flanges are provided in an outer face of each connecting edge with at least one recess in which is seated a corresponding latch on an inner face of an outer wall of the L-shaped channel, said channel outer wall remaining coplanar with an outer face of the respective panel upon assembly of the angle plate.

13. A structure in accordance with claim 12, wherein each channel comprises a continuous wall.

14. A structure in accordance with claim 13, wherein each lower angle plate is provided with a latching portion extending inward from opposite side walls at each end of the L-shaped channel to fit in respective steps provided in an end edge of the adjacent panel.

15. A structure in accordance with claim 1, wherein each panel includes at least a pair of locking means on one of its said first and second connecting edges and a like number of pairs of retaining flanges on the other of its said first and second connecting edges.

16. A structure in accordance with claim 1 wherein a said backstop element has an abutment face facing the adjacent panel and said support shoe has a contact face spaced from the inner face of the respective panel and against which the abutment face of a respective backstop element is seated upon connection of the two panels, said backstop element being seatable on the support shoe by displacement of the abutment face on a respective contact face.

17. A structure in accordance with claim 16, wherein a contact face of a support shoe is spaced apart from the corresponding seat face of the backstop element to allow the insertion of the connecting edge of the adjacent panel.

18. A structure in accordance with claim 1, wherein the support shoe is seated on a respective recessed portion of the adjacent panel to have its outer face parallel to the outer face of the adjacent panel.

19. A structure in accordance with claim 1, wherein the flexible end projecting means of the second connecting edge of said panel is elastically deformable from a non-operating position of unlatched panels to an operating position of latched panels.

20. A structure in accordance with claim 1, wherein each panel is a single planar body, the backstop element is attached to the inner face of each panel and spaced apart from the first connecting edge of said panel, the flexible flap of said first connecting edge extending along said edge and parallel to the adjacent panel, said plurality of projections being arranged along said flexible flap, a pair of retaining flanges attached to the panel structure in a plane orthogonal to the intersection of two adjacent panels, each flange being arranged on one of the opposite ends of said first connecting edge, said support shoes being provided along said second connecting edge of each panel and aligned with respective backstop elements of an adjacent panel to seat on said shoes when said panels are latched together, second said flexible end projecting means being elastic and seating on the inner face of an adjacent panel in an operating position and arranged along said second connecting edge of an adjacent panel, a plurality of windows arranged along said flexible end projecting means to allow the sliding of each corresponding backstop element on a respective support shoe upon latching of two adjacent panels, and a locking means attached to each end of said second connecting edge of each panel, one of said locking means having an internal flap parallel to the face of the adjacent panel which faces inwardly of the polygonal structure.

* * * * *